United States Patent
Lahr et al.

(10) Patent No.: US 10,955,025 B2
(45) Date of Patent: Mar. 23, 2021

(54) VEHICLE POWERTRAIN VARIABLE VIBRATION ABSORBER ASSEMBLY

(71) Applicant: GM Global Technology Operations LLC, Detroit, MI (US)

(72) Inventors: Derek F. Lahr, Howell, MI (US); Neeraj S. Shidore, Novi, MI (US); James B. Borgerson, Clarkston, MI (US); Chunhao J. Lee, Troy, MI (US); Norman K. Bucknor, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 319 days.

(21) Appl. No.: 15/994,436

(22) Filed: May 31, 2018

(65) Prior Publication Data
US 2019/0368570 A1 Dec. 5, 2019

(51) Int. Cl.
*F16F 15/00* (2006.01)
*F16F 15/22* (2006.01)

(52) U.S. Cl.
CPC ........... *F16F 15/002* (2013.01); *F16F 15/22* (2013.01); *F16F 2222/08* (2013.01); *F16F 2228/066* (2013.01)

(58) Field of Classification Search
CPC ........ F16F 15/002; F16F 15/22; F16F 222/08; F16F 228/066; B60K 6/445
See application file for complete search history.

(56) References Cited

U.S. PATENT DOCUMENTS

| | | | | |
|---|---|---|---|---|
| 7,175,555 B2* | 2/2007 | Kozarekar | ............... | B60K 6/40 475/5 |
| 7,226,384 B2* | 6/2007 | Tryon | ................. | F16D 25/0638 192/201 |
| 7,485,066 B2* | 2/2009 | Bailey | ..................... | F16D 25/10 192/48.604 |
| 8,190,348 B2* | 5/2012 | Gagliano | ................. | B62D 5/07 701/111 |
| 8,276,720 B2* | 10/2012 | Farahati | ............ | F16F 15/13484 188/291 |
| 8,517,889 B2* | 8/2013 | Misala | ..................... | F16H 55/36 475/322 |
| 9,664,250 B2* | 5/2017 | Kwon | ................. | F16F 15/1442 |
| 10,006,517 B2* | 6/2018 | Li | ......................... | F16F 15/1232 |
| 10,119,604 B2* | 11/2018 | Li | ......................... | B60K 17/00 |
| 10,151,373 B1* | 12/2018 | Li | ......................... | F16F 15/1478 |
| 10,309,483 B2* | 6/2019 | Takikawa | ................ | F16H 45/02 |

(Continued)

*Primary Examiner* — Katy M Ebner

(57) ABSTRACT

A vehicle powertrain variable vibration absorber assembly can be equipped in a hybrid electric vehicle (HEV). The vehicle powertrain variable vibration absorber assembly includes a rotary device, a drive-ratio assembly, and a spring. The rotary device, in an example, is a motor-generator unit (MGU). The drive-ratio assembly, in an example, is a planetary gear assembly. The drive-ratio assembly receives rotational drive input from the rotary device, and transmits rotational drive output to a powertrain component. The spring, in an example, is a variable stiffness spring. The spring is connected to the drive-ratio assembly and is connected to a grounded component. During use, the vehicle powertrain variable vibration absorber assembly absorbs different frequencies of vibration brought about by a vehicle engine amid different operating modes. The operating modes can involve cylinder deactivation technologies.

20 Claims, 1 Drawing Sheet

(56) References Cited

U.S. PATENT DOCUMENTS

| | | | |
|---|---|---|---|
| 10,400,691 B2* | 9/2019 | Serrano | F02D 13/06 |
| 10,473,197 B2* | 11/2019 | Lahr | F16F 15/1213 |
| 10,493,836 B2* | 12/2019 | Serrano | F16F 15/121 |
| 10,655,698 B2* | 5/2020 | Lee | F16F 7/1011 |
| 10,724,600 B2* | 7/2020 | Matsuoka | F16F 15/1428 |
| 10,752,072 B2* | 8/2020 | Samyn | B60G 13/003 |
| 10,794,449 B2* | 10/2020 | Barnes | F16F 15/265 |
| 10,808,796 B2* | 10/2020 | Tomita | F16F 15/145 |
| 2010/0096788 A1* | 4/2010 | Farahati | F16F 15/13484 |
| | | | 267/140.13 |
| 2016/0160957 A1* | 6/2016 | Dieckhoff | F16F 15/13157 |
| | | | 192/3.28 |
| 2017/0045112 A1* | 2/2017 | Li | F16F 15/12353 |
| 2019/0217852 A1* | 7/2019 | Komoda | G01M 15/11 |
| 2019/0368570 A1* | 12/2019 | Lahr | F16F 15/002 |

* cited by examiner

VEHICLE POWERTRAIN VARIABLE VIBRATION ABSORBER ASSEMBLY

INTRODUCTION

The present disclosure relates to vibration absorbers used in vehicle powertrains, and more particularly relates to variable vibration absorbers used in hybrid electric vehicle (HEV) powertrains.

Vibration absorbers are typically employed in vehicle powertrains in order to absorb vibrations emitted by the various components of the vehicle powertrains during use. Oftentimes, a particular vibration absorber is designed and constructed and intended to absorb a particular frequency of vibration. This approach can be largely effective when the particular frequency of vibration is known to be the sole or primary frequency of vibration emitted from a certain powertrain component.

But some powertrain components present a more considerable challenge when they emit different frequencies of vibration in different operating conditions. An example is an internal combustion vehicle engine equipped with cylinder deactivation technologies. When one or more of its cylinders are shut off and deactivated, the vehicle engine can emit a different frequency of vibration than when all of its cylinders are turned on and activated. Likewise, the vehicle engine can emit different frequencies of vibration with various combinations of activated and deactivated cylinders. And while a particular vibration absorber may be effective at absorbing one frequency of vibration of the vehicle engine, it might be less effective at absorbing another frequency of vibration emitted by the vehicle engine.

SUMMARY

In an embodiment, a vehicle powertrain vibration absorber assembly may include a rotary device, a drive-ratio assembly, and a spring. The drive-ratio assembly receives rotational drive input from the rotary device and transmits rotational drive output to a powertrain component. The spring is connected to the drive-ratio assembly at one end of the spring, and is connected to a grounded component at another end of the spring. During use of the vehicle powertrain variable vibration absorber assembly, the powertrain variable vibration absorber assembly absorbs different frequencies of vibration brought about by a vehicle engine amid different operating modes of the vehicle engine.

In an embodiment, the rotary device is a motor-generator unit (MGU) with a rotor shaft that transmits rotational drive output to the drive-ratio assembly.

In an embodiment, the drive-ratio assembly is a planetary gearset assembly with a first component, or more components, that receives rotational drive input from the rotary device, and with a second component, or more components, that transmits rotational drive output to the powertrain component.

In an embodiment, the spring is connected to a non-rotating component of the planetary gearset assembly at the one end of the spring.

In an embodiment, the spring is a variable stiffness spring that is connected to the drive-ratio assembly at one end of the variable stiffness spring, and that is connected to the grounded component at another end of the variable stiffness spring.

In an embodiment, the vehicle powertrain vibration absorber assembly may further include a controller. The controller manages the stiffness extent of the variable stiffness spring based in part or more on the frequencies of vibration brought about by the vehicle engine amid the different operating modes of the vehicle engine.

In an embodiment, the drive-ratio assembly is a continuously variable transmission (CVT) assembly. Here, the spring is connected to the CVT assembly at one end of the spring, and is connected to the grounded component at the other end of the spring.

In an embodiment, as the drive ratio is being varied by way of the CVT assembly, the stiffness extent of the spring is simultaneously being varied by expansion and contraction actions of the spring.

In an embodiment, the spring is connected to a non-rotating component of the drive-ratio assembly.

In an embodiment, the vehicle powertrain vibration absorber assembly may further include a lock-out device. The lock-out device is interengaged with the spring in order to preclude the vibration absorption effected by the connection of the spring to the drive-ratio assembly.

In an embodiment, the rotary device, drive-ratio assembly, and spring—when taken together—establish an arrangement relative to one another that is generally parallel to a vehicle powertrain driveline.

In an embodiment, the grounded component to which the spring is connected is a powertrain housing.

In an embodiment, the different operating modes of the vehicle engine include deactivation of one or more cylinders of the vehicle engine amid operation of the vehicle engine.

In an embodiment, a vehicle powertrain vibration absorber assembly may include a motor-generator unit (MGU), a planetary gearset assembly, and a variable stiffness spring. The MGU has a rotor shaft. The planetary gearset assembly has a first component, or more components, that receives rotational drive input from the rotor shaft of the MGU. The planetary gearset assembly has a second component, or more components, that transmits rotational drive output to a powertrain component. The variable stiffness spring is connected to a non-rotating component of the planetary gearset assembly, and is connected to a non-rotating powertrain housing. During use of the vehicle powertrain variable vibration absorber assembly, the vehicle powertrain variable vibration absorber assembly absorbs different frequencies of vibration brought about by a vehicle engine.

In an embodiment, the vehicle powertrain vibration absorber assembly may further include a controller. The controller manages the stiffness extent of the variable stiffness spring based in part or more on the frequencies of vibration brought about by the vehicle engine.

In an embodiment, the vehicle powertrain vibration absorber assembly may further include a lock-out device. The lock-out device is interengaged with the variable stiffness spring. When prompted, the lock-out device precludes the vibration absorption effected by the connection of the variable stiffness spring to the non-rotating component of the planetary gearset assembly.

In an embodiment, the MGU and its rotor shaft, the planetary gearset assembly, and the variable stiffness spring—when taken together—establish a general arrangement relative to one another that is generally parallel to a vehicle powertrain driveline.

In an embodiment, a vehicle powertrain vibration absorber assembly may include a rotary device, a drive-ratio assembly, and a spring. The drive-ratio assembly receives rotational drive input from the rotary device, and transmits rotational drive output to a powertrain component. The spring is connected to a non-rotating component of the drive-ratio assembly, and is connected to a non-rotating powertrain housing. The rotary device, drive-ratio assembly, and spring—when taken together—establish a general arrangement relative to one another that is generally parallel to a vehicle powertrain driveline. During use of the vehicle powertrain variable vibration absorber assembly, the vehicle powertrain variable vibration absorber assembly absorbs different frequencies of vibration brought about by a vehicle engine.

In an embodiment, the rotary device is a motor-generator unit (MGU). The drive-ratio assembly is a planetary gearset assembly. And the spring is a variable stiffness spring.

In an embodiment, the vehicle powertrain vibration absorber assembly may further include a controller. The controller manages the stiffness extent of the variable stiffness spring based in part or more on the frequencies of vibration brought about by the vehicle engine.

BRIEF DESCRIPTION OF THE DRAWINGS

One or more aspects of the disclosure will hereinafter be described in conjunction with the appended drawings, wherein like designations denote like elements, and wherein.

DETAILED DESCRIPTION

Figure 1:
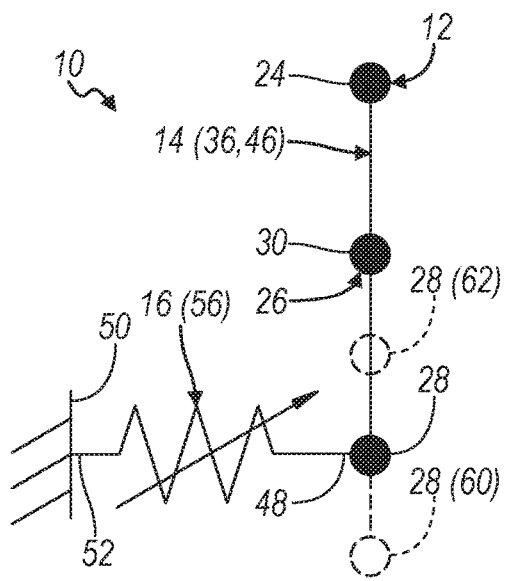
FIG. 1 is a schematic depiction of an embodiment of a vehicle powertrain variable vibration absorber assembly.

Referring to the drawings, a vehicle powertrain variable vibration absorber assembly 10 (hereafter, powertrain variable vibration absorber) is designed and constructed to absorb different frequencies of vibration emitted in the accompanying powertrain by an internal combustion vehicle engine. The vehicle engine can bring about numerous frequencies of vibration, particularly torsional vibrations, in its different modes of operation, such as when various combinations of engine cylinders are activated and deactivated with cylinder deactivation technologies. Several embodiments of the powertrain variable vibration absorber 10 are presented that can absorb these numerous vehicle engine vibrations more effectively and efficiently than previously known. In the embodiments, the powertrain variable vibration absorber 10 makes use of existing powertrain components and arrangements and—by supplementation of a spring—furnishes the functionality of a variable tuned mass damper. The powertrain variable vibration absorber 10 is described below in the context of an automotive application, yet could be equipped in non-automotive applications as well.

Figure 2:
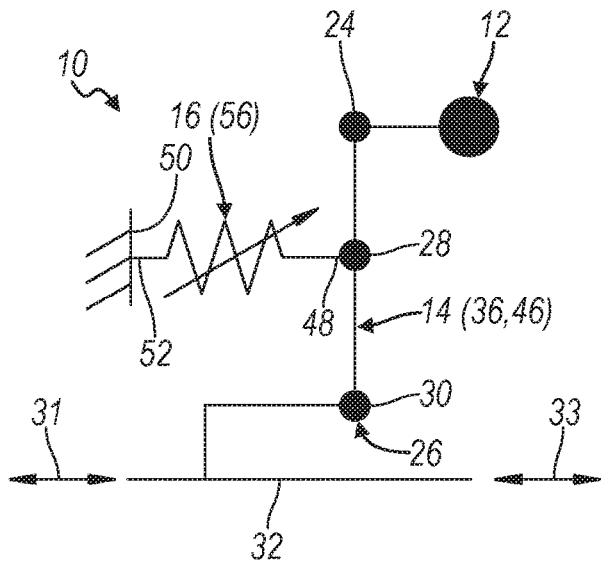
FIG. 2 is another schematic depiction of an embodiment of a vehicle powertrain variable vibration absorber assembly.
Figure 3:
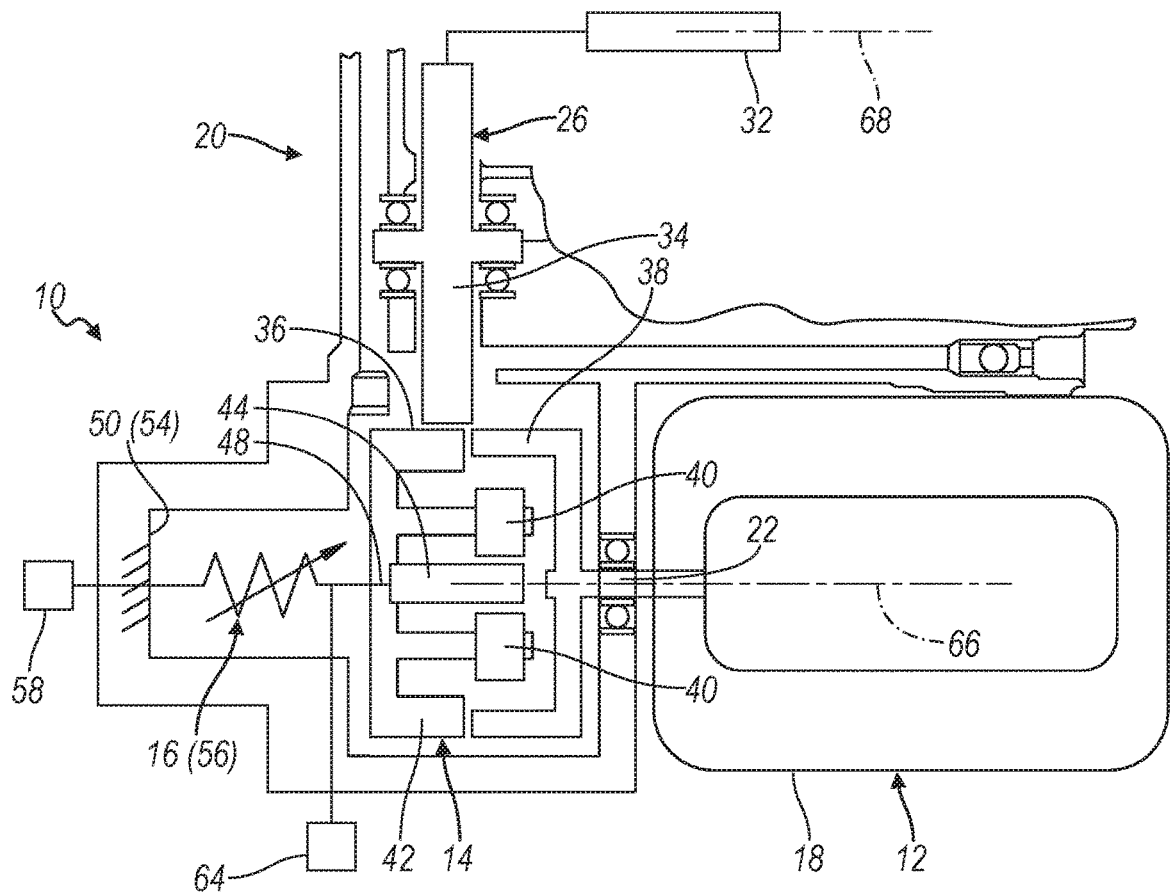
FIG. 3 depicts yet another embodiment of a vehicle powertrain variable vibration absorber assembly.

The powertrain variable vibration absorber 10 can have different designs, constructions, and components in different embodiments depending upon—among other possible factors—the designs and constructions and components of the associated powertrain in which the powertrain variable vibration absorber 10 is equipped. In the embodiment of FIGS. 1 and 2, the powertrain variable vibration absorber 10 includes a rotary device 12, a drive-ratio assembly 14, and a spring 16. The rotary device 12 serves as the inertia element in the overall vibratory absorption system established by the components of the powertrain variable vibration absorber 10. In a general sense, the rotary device 12 provides rotational motion in the powertrain variable vibration absorber 10 and, in this embodiment, transmits rotational drive output directly to the drive-ratio assembly 14. In the embodiment of FIG. 3, the rotary device 12 is in the form of a motor-generator unit (MGU) 18. The MGU 18 is but one component of a larger mild hybrid electric vehicle (HEV) powertrain 20. A segmented section of the architecture of the mild HEV powertrain 20 is depicted by FIG. 3. The MGU 18 has a rotor shaft 22 that is mechanically coupled to the drive-ratio assembly 14 and thereby imparts rotational drive output to the drive-ratio assembly 14. The mechanical coupling can involve a gear-to-gear meshing, or some other type of coupling technique.

The drive-ratio assembly 14 provides connection nodes in the overall vibratory absorption system established by the components of the powertrain variable vibration absorber 10. With reference again to FIGS. 1 and 2, the drive-ratio assembly 14 is connected to the rotary device 12 at a first node 24 and receives rotational drive input directly from the rotary device 12. The drive-ratio assembly 14 in the embodiment presented effects a gear reduction between its input at the rotary device 12 and its output at a powertrain component 26—this gear reduction is demanded in certain HEV powertrains. The gear reduction involves reducing rotational speed and increasing torque. The drive-ratio assembly 14 has a further connection to the spring 16 at a second node 28 and a further connection to the powertrain component 26 at a third node 30. The drive-ratio assembly 14 transmits rotational drive output directly to the powertrain component 26. The powertrain component 26 can itself ultimately transmit rotational drive output to a vehicle powertrain driveline 32. The vehicle powertrain driveline 32 can include an assemblage of drive shafts that deliver rotational power to wheels of the accompanying vehicle. In FIG. 2, in particular, arrow 31 is representative of input force to the vehicle powertrain driveline 32, and arrow 33 is representative of output motion from the vehicle powertrain driveline 32. In the embodiment of FIG. 3, the powertrain component 26 is a powertrain gear 34 that has a gear-to-gear meshing coupling with the drive-ratio assembly 14, and that can have a further downstream coupling to yet another component of the powertrain, eventually leading to the vehicle powertrain driveline 32.

The drive-ratio assembly 14 can take different forms in different embodiments, its precise form being dictated in part by the designs and constructions and components of the associated powertrain. In the embodiment of FIG. 3, the drive-ratio assembly 14 is a planetary gearset assembly 36. The planetary gearset assembly 36 includes a sun gear 38, planet gears 40, a ring gear 42, and a planet gear carrier 44. The sun gear 38 can have a gear-to-gear meshing coupling with the rotor shaft 22, or can have a more direct and immediate attachment thereto. The planet gears 40 receive direct revolving drive input from the sun gear 38. Further, the ring gear 42 receives direct rotational drive input from the planet gears 40, and transmits direct rotational drive output to the powertrain gear 34. And the planet gear carrier 44 supports revolution of the planet gears 40 about their respective axes. In this example, the planet gear carrier 44 does not itself rotate and instead its rotational position remains stationary while the other components of the planetary gearset assembly 36 rotate and revolve. Still, in other embodiments the planetary gearset assembly 36 can have other configurations in which its components transmit and receive drive output and input in different ways among one another. In addition, the drive-ratio assembly 14 can take the form of another type of gearset assembly apart from the planetary type in another embodiment. In the gearset assembly form, a housing or other support structure of the gearset assembly could lack rotation while its other components rotate in use. In yet another embodiment, the drive-ratio assembly 14 can take the form of a continuously variable transmission (CVT) assembly 46. Here, the CVT assembly 46 can have a drive pulley, a driven pulley, and a belt that links the two pulleys. The CVT assembly 46, as in previous embodiments, establishes the first node 26 and second node 28 and third node 30, and has a housing or other support structure that lacks rotation while its other components rotate in use.

When added as described, and in combination with the rotary device 12 and drive-ratio assembly 14, the spring 16 furnishes the functionality of a variable tuned mass damper in the mild HEV powertrain 20. The spring 16 can take different forms in different embodiments and its precise form may be dictated in part by the designs and constructions and components of the associated powertrain. With reference to FIGS. 1 and 2, the spring 16 is connected to the drive-ratio assembly 14 at the second node 28 at a first end 48 of the spring 16, and is connected to a grounded component 50 at a second end 52 of the spring 16. At the second node 28, the connection is to a non-rotating component of the drive-ratio assembly 14. The non-rotating component lacks rotation during use while other components of the drive-ratio assembly 14 can rotate or exhibit other movement, and in this sense the non-rotating component remains static during use of the drive-ratio assembly 14. The non-rotating component can be a housing or support structure of the drive-ratio assembly 14, or something else, depending on the form of the drive-ratio assembly 14. In the example of the planetary gearset assembly 36, and referring now to FIG. 3, the non-rotating component is the planet gear carrier 44 and hence the spring 16 is connected to that component of the planetary gearset assembly 36 at the first end 48. In the example of the CVT assembly 46, the non-rotating component can be its housing and hence the spring 16 is connected to that component of the CVT assembly 46 at the first end 48. The spring 16 can have a similar connection to the grounded component 50. That is, the grounded component 50 is a non-rotating component of the mild HEV powertrain 20 that lacks rotation during use while other components of the mild HEV powertrain 20 can rotate or exhibit other movement, and in this sense the grounded component 50 remains static during use of the mild HEV powertrain 20. With particular reference to FIG. 3, the grounded component 50 is a housing or casing 54 of the mild HEV powertrain 20.

In one form, the spring 16 is a variable stiffness spring 56 with a stiffness extent that can be altered during its use. The alteration of stiffness can be carried out in a number of ways. In the example presented by FIG. 3, a controller 58 interacts with the variable stiffness spring 56 and manages the rigidity and/or flexibility effect of the variable stiffness spring 56. The controller 58 can alter the stiffness of the variable stiffness spring 56 based upon, and in response to, the particular frequency of vibration emitted by one or more components of the mild HEV powertrain 20. Vibration sensors disposed in the mild HEV powertrain 20 can send vibration readings and measurements to the controller 58. For instance, in a vehicle engine outfitted with cylinder deactivation technologies, the vehicle engine can emit a first frequency of torsional vibrations when none of its cylinders are deactivated and all of its cylinders are activated. In another operating mode, the vehicle engine can emit a second frequency of torsional vibrations when one-half of its cylinders are deactivated, leaving one-half of its cylinders activated. For the first frequency of torsional vibrations, the controller 58 can instruct the variable stiffness spring 56 to exhibit a first stiffness extent, which is tuned to effectively absorb the first frequency of torsional vibrations encountered. Likewise, for the second frequency of torsional vibrations, the controller 58 can instruct the variable stiffness spring 56 to exhibit a second stiffness extent, which is tuned to effectively absorb the second frequency of torsional vibrations encountered. Still, the variable stiffness spring 56 can exhibit further stiffness extents set to absorb further frequencies of vibrations. In this way, the powertrain variable vibration absorber 10 provides semi-active vibration absorption.

In another form, and when the drive-ratio assembly 14 is the CVT assembly 46, the spring 16 need not be of the variable stiffness type. Rather, the stiffness extent of the spring 16 can be altered in response to the drive ratio being varied by the CVT assembly 46. As the drive ratio varies, the stiffness extent alters in a concomitant manner. This is presented schematically in FIG. 1—when the CVT assembly 46 varies the drive ratio to a first state 60, the spring 16 expands in length and consequently exhibits a first stiffness extent which is tuned to effectively absorb the vibrations encountered at the first state 60; similarly, when the CVT assembly 46 varies the drive ratio to a second state 62, the spring 16 contracts in length and consequently exhibits a second stiffness extent which is turned to effectively absorb the vibrations encountered at the second state 62. Still, the spring 16 can exhibit further stiffness extents at other drive ratio states via attendant length expansion and contraction. In this way, the powertrain variable vibration absorber 10 provides semi-active vibration absorption.

In a yet further embodiment of the powertrain variable vibration absorber 10, and with reference to FIG. 3, a lock-out device 64 is provided. The lock-out device 64 is interengaged with the spring 16 and, when prompted, precludes the vibration absorption functionality introduced by the addition of the spring 16. This preclusion may be prompted at certain operating modes of the mild HEV powertrain 20, such as during regenerative braking operations. The lock-out device 64 can take different forms in different embodiments and its precise form may be dictated in part by the form of the spring 16. The lock-out device 64 can be integrally incorporated into the spring 16 itself, or can be a discrete component. In different examples, the lock-out device 64 can be a friction clutch, a dog clutch, or a selectable one-way clutch.

In use, the powertrain variable vibration absorber 10 furnishes the functionality of a variable tuned mass damper. In the embodiment of FIG. 3, for example, the MGU 18, the planetary gearset assembly 36, and the variable stiffness spring 56 establish a general arrangement and alignment relative to one another about a first axis 66. And the first axis 66 is generally parallel to a second axis 68, about which the vehicle powertrain driveline 32 establishes a general arrangement and alignment with. This parallel arrangement contributes to the formation and functionality of a variable tuned mass damper. Still, in other embodiments, the parallel arrangement can be established with other components and in other ways in a powertrain driveline. Moreover, in at least some embodiments, the drive-ratio assembly 14 can promote augmentation of the inertia effected in the overall vibratory absorption system by the rotary device 12, which is thought to enhance the effectiveness of vibration absorption by the powertrain variable vibration absorber 10. This may be especially true when the drive-ratio assembly 14 is in the form of the planetary gearset assembly 36 which, in application, reduces speed and increases torque. The augmentation permits the use of an inertia element in the overall vibratory absorption system, such as the MGU 18, of lower magnitude than may otherwise be the case. Furthermore, in the embodiment of the mild HEV powertrain 20, the added variable stiffness spring 56 to the already existing components of the powertrain architecture—namely, the MGU 18 and planetary gearset assembly 36—transforms the arrangement into a variable tuned mass damper. The inertia of the MGU 18 is utilized and exploited for vibration absorption purposes in this regard.

It is to be understood that the foregoing is a description of one or more aspects of the disclosure. The disclosure is not limited to the particular embodiment(s) disclosed herein, but rather is defined solely by the claims below. Furthermore, the statements contained in the foregoing description relate to particular embodiments and are not to be construed as limitations on the scope of the disclosure or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A vehicle powertrain variable vibration absorber assembly, comprising:
   a rotary device;
   a drive-ratio assembly receiving rotational drive input from the rotary device and transmitting rotational drive output to a powertrain component; and
   a spring connected to the drive-ratio assembly at one end of the spring and connected to a grounded component at another end of the spring;
   wherein, during use of the vehicle powertrain variable vibration absorber assembly, the vehicle powertrain variable vibration absorber assembly absorbs different frequencies of vibration brought about by a vehicle engine amid different operating modes of the vehicle engine.

2. The vehicle powertrain variable vibration absorber assembly of claim 1, wherein the rotary device is a motor-generator unit (MGU) with a rotor shaft transmitting rotational drive output to the drive-ratio assembly.

3. The vehicle powertrain variable vibration absorber assembly of claim 1, wherein the drive-ratio assembly is a planetary gearset assembly with at least a first component receiving rotational drive input from the rotary device and with at least a second component transmitting rotational drive output to the powertrain component.

4. The vehicle powertrain variable vibration absorber assembly of claim 3, wherein the spring is connected to a non-rotating component of the planetary gearset assembly at the one end of the spring.

5. The vehicle powertrain variable vibration absorber assembly of claim 1, wherein the spring is a variable stiffness spring connected to the drive-ratio assembly at one end of the variable stiffness spring and connected to the grounded component at another end of the variable stiffness spring.

6. The vehicle powertrain variable vibration absorber assembly of claim 5, further comprising a controller, the controller managing the stiffness extent of the variable stiffness spring based at least in part upon the frequencies of vibration brought about by the vehicle engine amid the different operating modes of the vehicle engine.

7. The vehicle powertrain variable vibration absorber assembly of claim 1, wherein the drive-ratio assembly is a continuously variable transmission (CVT) assembly, and wherein the spring is connected to the CVT assembly at one end of the spring and connected to the grounded component at another end of the spring.

8. The vehicle powertrain variable vibration absorber assembly of claim 7, wherein, as the drive ratio is being varied via the CVT assembly, the stiffness extent of the spring is concurrently being varied by expansion and contraction actions of the spring.

9. The vehicle powertrain variable vibration absorber assembly of claim 1, wherein the spring is connected to a non-rotating component of the drive-ratio assembly.

10. The vehicle powertrain variable vibration absorber assembly of claim 1, further comprising a lock-out device interengaged with the spring in order to preclude the vibration absorption effected by the connection of the spring to the drive-ratio assembly.

11. The vehicle powertrain variable vibration absorber assembly of claim 1, wherein the rotary device, drive-ratio assembly, and spring establish an arrangement relative to one another that is generally parallel to a vehicle powertrain driveline.

12. The vehicle powertrain variable vibration absorber assembly of claim 1, wherein the grounded component to which the spring is connected is a powertrain housing.

13. The vehicle powertrain variable vibration absorber assembly of claim 1, wherein the different operating modes of the vehicle engine include deactivation of at least one cylinder of the vehicle engine amid operation of the vehicle engine.

14. A vehicle powertrain variable vibration absorber assembly, comprising:
   a motor-generator unit (MGU) with a rotor shaft;
   a planetary gearset assembly having at least a first component receiving rotational drive input from the rotor shaft of the MGU, and having at least a second component transmitting rotational drive output to a powertrain component; and
   a variable stiffness spring connected to a non-rotating component of the planetary gearset assembly and connected to a non-rotating powertrain housing;
   wherein, during use of the vehicle powertrain variable vibration absorber assembly, the vehicle powertrain variable vibration absorber assembly absorbs different frequencies of vibration brought about by a vehicle engine.

15. The vehicle powertrain variable vibration absorber assembly of claim 14, further comprising a controller, the controller managing the stiffness extent of the variable stiffness spring based at least in part upon the frequencies of vibration brought about by the vehicle engine.

16. The vehicle powertrain variable vibration absorber assembly of claim 14, further comprising a lock-out device interengaged with the variable stiffness spring that, when prompted, precludes the vibration absorption effected by the connection of the variable stiffness spring to the non-rotating component of the planetary gearset assembly.

17. The vehicle powertrain variable vibration absorber assembly of claim 14, wherein the MGU and its rotor shaft, the planetary gearset assembly, and the variable stiffness spring establish a general arrangement relative to one another that is generally parallel to a vehicle powertrain driveline.

18. A vehicle powertrain variable vibration absorber assembly, comprising:
- a rotary device;
- a drive-ratio assembly receiving rotational drive input from the rotary device and transmitting rotational drive output to a powertrain component; and
- a spring connected to a non-rotating component of the drive-ratio assembly and connected to a non-rotating powertrain housing;
- wherein the rotary device, drive-ratio assembly, and spring establish a general arrangement relative to one another that is generally parallel to a vehicle powertrain driveline;
- and wherein, during use of the vehicle powertrain variable vibration absorber assembly, the vehicle powertrain variable vibration absorber assembly absorbs different frequencies of vibration brought about by a vehicle engine.

19. The vehicle powertrain variable vibration absorber assembly of claim 18, wherein the rotary device is a motor-generator unit (MGU), the drive-ratio assembly is a planetary gearset assembly, and the spring is a variable stiffness spring.

20. The vehicle powertrain variable vibration absorber assembly of claim 19, further comprising a controller, the controller managing the stiffness extent of the variable stiffness spring based at least in part upon the frequencies of vibration brought about by the vehicle engine.

\* \* \* \* \*